(12) United States Patent
Kinarti et al.

(10) Patent No.: US 10,659,385 B2
(45) Date of Patent: May 19, 2020

(54) PROVISIONING INSIGHT SERVICES IN A DATA PROVIDER LANDSCAPE

(71) Applicant: SAP Portals Israel Ltd., Ra'anana (IL)

(72) Inventors: Barak Kinarti, Kfar Saba (IL); Eyal Nathan, Reut (IL); Amir Blich, Ra'anana (IL); Ido Fishler, Tel Aviv (IL); Marcus Behrens, Heidelberg (DE)

(73) Assignee: SAP Portals Israel Ltd., Ra'anana (IL)

( * ) Notice: Subject to any disclaimer, the term of this patent is extended or adjusted under 35 U.S.C. 154(b) by 278 days.

(21) Appl. No.: 15/342,416

(22) Filed: Nov. 3, 2016

(65) Prior Publication Data

US 2018/0123967 A1    May 3, 2018

(51) Int. Cl.
*H04L 12/911* (2013.01)
*H04L 12/26* (2006.01)
*H04L 29/08* (2006.01)
*H04L 12/24* (2006.01)

(52) U.S. Cl.
CPC .............. *H04L 47/70* (2013.01); *H04L 67/10* (2013.01); *H04L 41/0896* (2013.01)

(58) Field of Classification Search
None
See application file for complete search history.

(56) References Cited

U.S. PATENT DOCUMENTS

| | | |
|---|---|---|
| 9,146,802 B2 | 9/2015 | Tran et al. |
| 9,330,726 B1 | 5/2016 | Lawson et al. |
| 9,454,993 B1 | 9/2016 | Lawson et al. |
| 2002/0041284 A1 | 4/2002 | Kentaro et al. |
| 2004/0098358 A1* | 5/2004 | Roediger ............. G06N 5/00 706/46 |
| 2008/0126980 A1 | 5/2008 | Bachmann et al. |
| 2010/0048187 A1 | 2/2010 | Sullivan |
| 2010/0332262 A1* | 12/2010 | Horvitz ............. G06F 9/5027 705/4 |

(Continued)

OTHER PUBLICATIONS

Communication dated from EPO re European Search report dated Jun. 21, 2017 for EP Application No. 16002495.6-1862 (10 pages).

(Continued)

*Primary Examiner* — Philip J Chea
*Assistant Examiner* — Hassan A Khan
(74) *Attorney, Agent, or Firm* — Fish & Richardson P.C.

(57) ABSTRACT

The present disclosure involves systems, software, and computer implemented methods for provisioning insight services in a data provider landscape. A method includes presenting an algorithm description of an algorithm provided by an algorithm provider that is to be executed in a landscape of a data provider. Selection of the algorithm is received from a data consumer. The selected algorithm is provided to an agent at the data provider. The agent is configured to provision resources in the landscape of the data provider, according to the algorithm description, to enable execution of the selected algorithm in the landscape of the data provider. The agent is configured to execute the selected algorithm in the landscape of the data provider, using data included in the landscape of the data provider, producing one or more outputs. The agent is configured to enable monitoring of the execution of the selected algorithm.

13 Claims, 6 Drawing Sheets

(56) References Cited

U.S. PATENT DOCUMENTS

| | | | |
|---|---|---|---|
| 2011/0016214 A1* | 1/2011 | Jackson | G06F 9/5044 |
| | | | 709/226 |
| 2011/0035187 A1* | 2/2011 | Dejori | G01D 9/005 |
| | | | 702/187 |
| 2014/0250153 A1* | 9/2014 | Nixon | G05B 19/042 |
| | | | 707/812 |
| 2014/0359552 A1* | 12/2014 | Misra | H04L 67/12 |
| | | | 717/100 |
| 2014/0372427 A1* | 12/2014 | Lehmann | G06F 16/583 |
| | | | 707/736 |
| 2016/0065417 A1* | 3/2016 | Sapuram | G06Q 30/0631 |
| | | | 709/223 |
| 2016/0112524 A1 | 4/2016 | Sutou et al. | |
| 2016/0226955 A1* | 8/2016 | Moorthi | G06Q 10/06 |
| 2016/0291826 A1* | 10/2016 | Verzano | H04L 41/145 |
| 2016/0359664 A1* | 12/2016 | Malegaonkar | G06F 8/34 |
| 2017/0063709 A1* | 3/2017 | Smith | H04L 67/306 |
| 2017/0300598 A1* | 10/2017 | Akavia | G06Q 50/04 |
| 2017/0331887 A1* | 11/2017 | Fishler | H04L 67/1087 |

OTHER PUBLICATIONS

U.S. Appl. No. 15/220,587, filed Jul. 27, 2016, Hoffner et al.
USPTO Non-final Office Action in related U.S. Appl. No. 15/220,587 dated Apr. 9, 2018; 13 pages.

* cited by examiner

PROVISIONING INSIGHT SERVICES IN A DATA PROVIDER LANDSCAPE

BACKGROUND

Recently, there has been a dramatic increase in the number of appliances, devices, vehicles, and/or other types of objects that include data collection, computing, sensing, and/or network communications capabilities in addition to their normal functionality. These objects, described as smart appliances, smart vehicles, smart buildings, smart infrastructure components, and so forth, may be organized into an Internet of Things (IoT), through which the objects may generate and exchange data. An IoT device, system, and/or infrastructure may enable objects to be sensed and controlled remotely over network(s), and the data generated by the objects may be collected, analyzed, or otherwise processed by computing devices and/or individuals. The large and ever-increasing quantity of data generated by IoT objects poses a challenge, given the limited capacity of traditional systems to communicate, store, and process the data.

A company can perform analytics processing on a set of data, such as IoT data. Analytics can involve the discovery of patterns in the set of data. Analytics can include the use of statistics, computer programming, and operations research, for example. Data visualizations can be used to presents insights generated from the analytics processing. Analytics can be performed, for example, by a data scientist. A data scientist can be knowledgeable in information science, computer science, statistics, probability, and machine learning, as well as in a particular type of data.

SUMMARY

The present disclosure involves systems, software, and computer implemented methods for provisioning insight services in a data provider landscape. A method includes presenting an algorithm description of an algorithm provided by an algorithm provider that is to be executed in a landscape of a data provider. Selection of the algorithm is received from a data consumer. The selected algorithm is provided to an agent at the data provider. The agent is configured to provision resources in the landscape of the data provider, according to the algorithm description, to enable execution of the selected algorithm in the landscape of the data provider. The agent is configured to execute the selected algorithm in the landscape of the data provider, using data included in the landscape of the data provider, producing one or more outputs. The agent is configured to enable monitoring of the execution of the selected algorithm.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
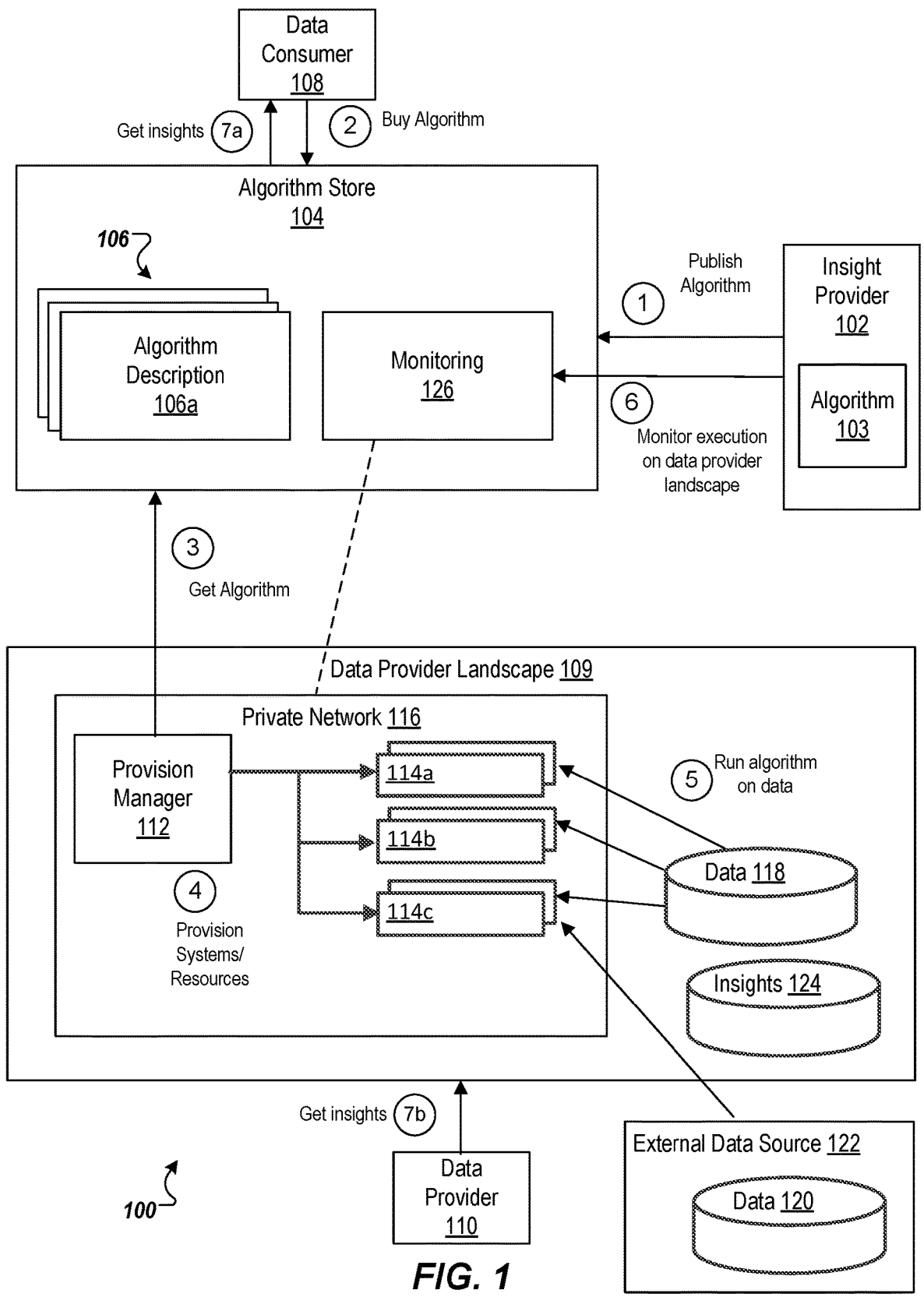
FIG. 1 is a block diagram of an example environment for provisioning insight services in a data provider landscape.

A data provider (e.g., an entity, such as a company) can have a computing system landscape that generates a set of data. The data can be of any type, such as electric company data, health care data, or IoT (Internet of Things) data, to name just a few examples. Other examples of data generation are described below.

A data provider may desire to run one or more algorithms on data generated by the data provider. Algorithms can be for predictive maintenance, forecasting insights, business intelligence, or other types of analysis. The data provider may consider using third party algorithms on data generated by the data provider, such as where the data provider may not have resources or expertise needed to generate the algorithms they need or desire to use, for example. As another example, the data provider may desire to test various algorithms and compare results of running multiple algorithms, including algorithms created by the data provider and/or algorithms created by third parties. Third parties may specialize in particular types of algorithms, for example, and may employ data scientists and other experts.

Various approaches can be used to enable the running of a third party algorithm on data provider generated data. For example, the data provider can transfer generated data to the third party algorithm provider over a network. However, some data providers generate a significant amount of data which may make transferring over a network impractical. As another example, the data provider can provide the algorithm provider a hard drive that includes the data provider generated data. Such an approach requires resources (e.g., people, time, hardware). Moreover, transferring data outside of the landscape of the data provider, either over a network or on physical media, may not be desired or legal for some data providers. Health care data, for example, may not be allowed to be taken outside of a healthcare data provider premise. Other security or other concerns may make transferring data undesirable. The data provider may not trust third parties to have access to data provider data, as they may not trust that the data is inaccessible to other parties, for example.

Another approach for enabling a third party algorithm to run on data provider data is for the third party to do custom development at the data provider site to integrate the third party algorithm into the landscape of the data provider. Such an approach can be costly, time consuming (e.g., multi month projects), and can be inflexible. Also, a data provider cannot easily try out and compare different algorithms if such expensive, time-consuming custom integration is performed. The data provider can invest a lot of time and money for custom development, and can't easily try out algorithms provided by other parties once such investment is made.

To solve cost, legal, efficiency, and other issues with the above approaches, an algorithm provisioning environment can be configured so that algorithm providers can publish their algorithms for consideration of use on premise or in the cloud for integration at or into data provider landscapes. An algorithm provider can provide an algorithm description and a description of resources and data used by the algorithm. Various algorithm providers can provide algorithm descriptions to a centralized server, and the centralized server can provide a search service that enables users to search for and obtain information about available algorithms. The centralized server can provide an agent that can be installed on data provider systems. When an algorithm is selected for execution on and submission to a particular data provider, the agent can determine whether necessary resources are available in the data provider's landscape, and provision the resources for execution of the algorithm. Outputs provided by the algorithm can be provided to the data provider. Additionally, the algorithm provider can be provided performance information related to the execution.

A user can select multiple algorithms to be executed in the data provider landscape, and the user can compare results and decide upon a particular algorithm. Thus trials of multiple algorithms can be performed without costly investment in custom development for a particular algorithm. Various algorithms can be executed at a particular data provider, without the data provider data leaving the premise of the data provider, thereby avoiding legal and security issues that can occur with approaches that transfer data off site. Algorithm providers can benefit by having their algorithms receive publicity while presented by the search service and by the centralized server enabling execution trials at data provider sites.

A user of the centralized server can be referred to as a data consumer. A data consumer can be associated with the data provider or can be an entity that is separate from the data provider. Some data providers can, for example, approve of outside entities initiating execution of a third party algorithm in the landscape of the data provider and viewing outputs of the execution. The data consumer, data provider and algorithm provider can each be separate entities in some examples. As described in more detail below, an algorithm running in a first data provider landscape can be configured to obtain data provided by a second data provider who has agreed to make data of the second data provider publicly available.

FIG. 1 is a block diagram of an example environment 100 for provisioning insight services in a data provider landscape. In a first phase, an insight provider 102 (e.g., an algorithm provider) generates an algorithm 103 that can be executed on a data provider landscape having at least a set of particular kinds of resources (e.g., computing nodes, memory, network resources, virtual machines) and including particular types of data. In some instances, one or more data providers may also be insight providers 102. The algorithm 103 can include processing instructions which, when executed, can analyze instances of the particular types of data to produce one or more outputs, which can be referred to as insights. The insight provider 102 can publish the algorithm 103 to an algorithm store 104 by providing the algorithm 103 (or instructions for how the algorithm 103 can be retrieved from the insight provider 102) and an algorithm description 106a.

The algorithm description 106a, which can be referred to as a recipe, can include a problem domain in which the algorithm 103 is to be executed, an overview of the processing steps included in the algorithm 103, a description of resources that are required to execute the algorithm 103, and a description of how the resources are to be configured. The algorithm store 104 can include the algorithm description 106a among other algorithm descriptions 106 that have been provided by the insight provider 102 or other insight providers. The algorithm store 104 can provide a search service which allows data consumers, such as a data consumer 108, who want to run an algorithm on data provider data in a data provider landscape 109, to search for and browse available algorithms. The algorithm store 104 can provide an algorithm marketplace which facilitates connecting data consumers who want to run algorithms with insight providers who generate algorithms. The data consumer 108 can be a same entity as a data provider 110 who is associated with the data provider landscape 109, or can be a different entity, such as if the data provider 110 has granted permission for other parties to run algorithms on data included in the data provider landscape 109.

In a second phase, the data consumer 108 browses for, selects, and possibly purchases the algorithm description 106a for execution in the data provider landscape 109. An algorithm purchase can be a one-time purchase or can be a subscription-based purchase (e.g., a monthly price). A subscription price can be based on an amount of data processed, with larger amounts of data processed incurring a higher subscription price than for smaller amounts of processed data. Any suitable terms, pricing (including free algorithms), and usage terms and restrictions may be used in various implementations.

In a third phase, an agent 112 (e.g., a provision manager 112) included in the data provider landscape 109 obtains a copy of or a link to the algorithm 103 (e.g., either from the algorithm store 104 or the insight provider 102) using information included in the selected algorithm description 106a. The agent 112 may have been previously obtained from the algorithm store 104 by the data provider 110 and installed in the data provider landscape 109, for example. As another example, the agent 112 (and possibly the algorithm 103) may be pushed to the data provider landscape 109 in response to the data consumer 108 selecting the algorithm description 106a.

In a fourth phase, the agent 112 provisions resources 114a, 114b, and 114c in a private network 116 of the data provider landscape 109. The resources 114a, 114b and 114c can include computing nodes, memory, network resources, virtual machines, and other types of resources or systems. As described in more detail below, the agent 112 can determine whether the data provider landscape 109 includes resources sufficient to execute the algorithm 103, using and/or based on information included in the algorithm description 106a.

In a fifth phase, the agent 112 initiates execution of the algorithm 103 (e.g., either using an obtained copy of the algorithm 103 or a link to the algorithm 103) in the data provider landscape 109. The algorithm 103 can identify and process data 118 included in the data provider landscape 109. The data 118 used by the algorithm 103 can be current, real-time data or can be historical data. As another example, the algorithm 103 can be configured to access external data 120 from an external data source 122 (e.g., as described in more detail below). Execution of the algorithm 103 can produce one or more insights (e.g., outputs) 124. The insights 124 can be predictions, forecasts, or some other type of insight.

The algorithm 103 and/or the agent 112 can be configured to filter or scale an amount of data to be accessed, processed, or returned, based on one or more rules. For example, the external data source 122 can provide weather information and the algorithm 103 can be configured to access weather information for a particular location. As another example, data to be accessed, processed, or returned can be filtered or defined based at least in part on one or more inputs to the algorithm 103 that are provided by the data consumer 108.

In a sixth phase, the insight provider 102 can monitor execution (or execution results) of the algorithm 103 using a monitoring component 126 of the algorithm store 104. The insight provider 102 can view performance data associated with the execution of the algorithm 103, for example. The insight provider 102 can be prevented from viewing the insights 124 generated from the algorithm 103, unless the data provider 110 has given authorization for the insight provider 102 to view the insights 124.

In a seventh phase, the insights 124 are provided, such as to the data consumer 108 (e.g., phase 7a) and/or the data provider 110 (e.g., phase 7b). The data consumer 108 can view outputs, for example, using a centralized portal that is associated with the algorithm store 104. The data provider 110 can view outputs, for example, using the centralized portal and/or on a user interface that is presented on a device located in or associated with the data provider landscape 109.

Figure 2:
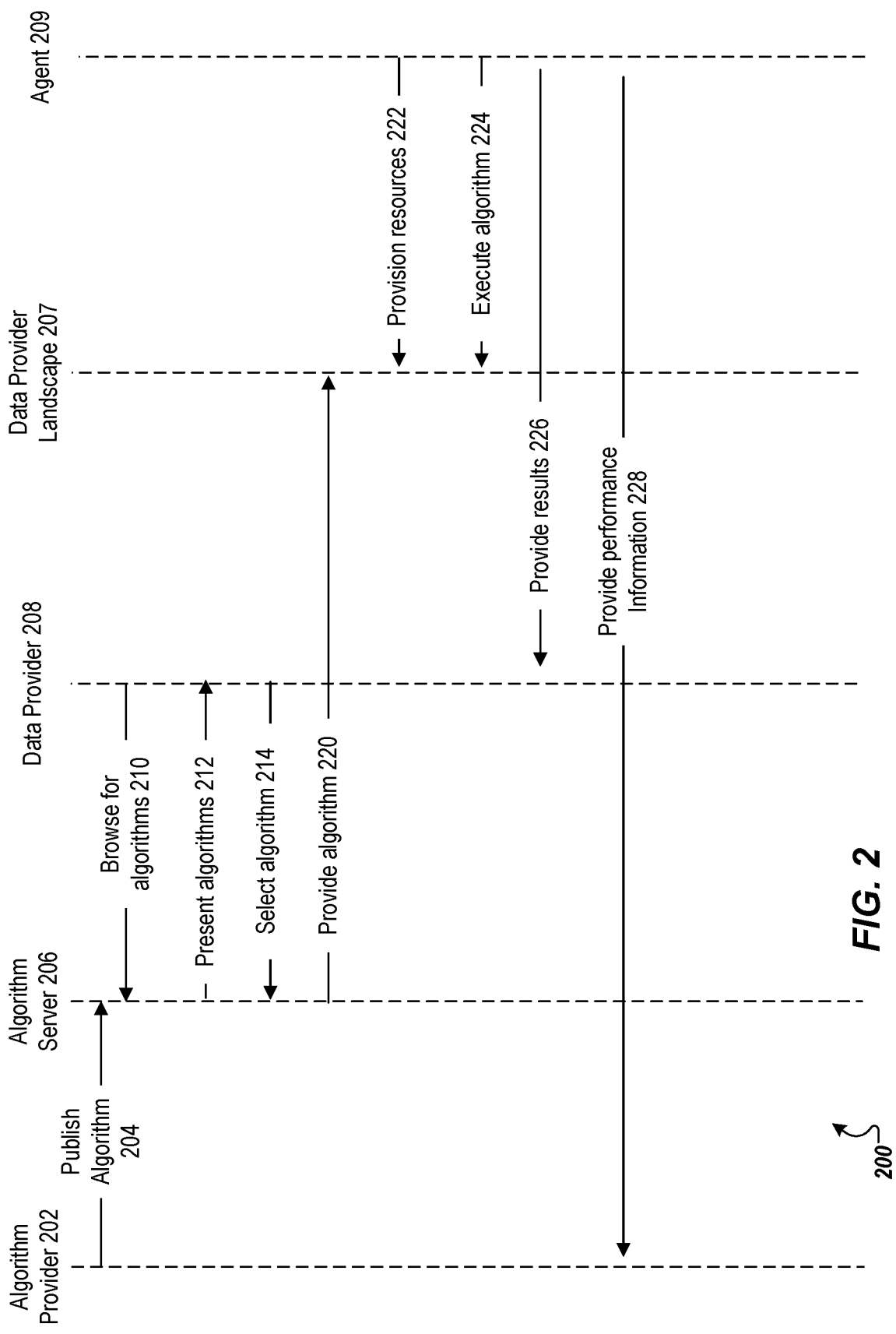
FIG. 2 is a flowchart of an example method for execution of an algorithm in a landscape of a data provider.

FIG. 2 is a flowchart of an example method 200 for execution of an algorithm in a landscape of a data provider. An algorithm provider 202 publishes an algorithm (204) to an algorithm server 206. The algorithm can be used in a landscape 207 of a data provider 208 and in landscapes of other data providers. The algorithm server 206 may have previously provided an agent 209 to the landscape 207 of the data provider 208. The data provider 208 sends a request to browse available algorithms (210) to the algorithm server 206. The algorithm server 206 provides a list of algorithms to be presented to the data provider 208 (212). The data provider 208 selects a presented algorithm and an indication of the selection is provided to the algorithm server 206 (214).

The algorithm server 206 provides the algorithm to be installed in the data provider landscape 207 of the data provider 208 (220). The agent 209 provisions resources of the data provider landscape 207 to prepare for execution of the algorithm (222). The agent 209 initiates execution of the algorithm in the data provider landscape 207 (224). The algorithm can use, as at least part of its input, data included in the data provider landscape 207. Execution of the algorithm can result in the generation of a set of results, which the agent 209 provides to the data provider 208 (226), e.g., in a user interface. The agent 209 can provide performance information regarding the execution of the algorithm to the algorithm provider 202 (228).

Figure 3:
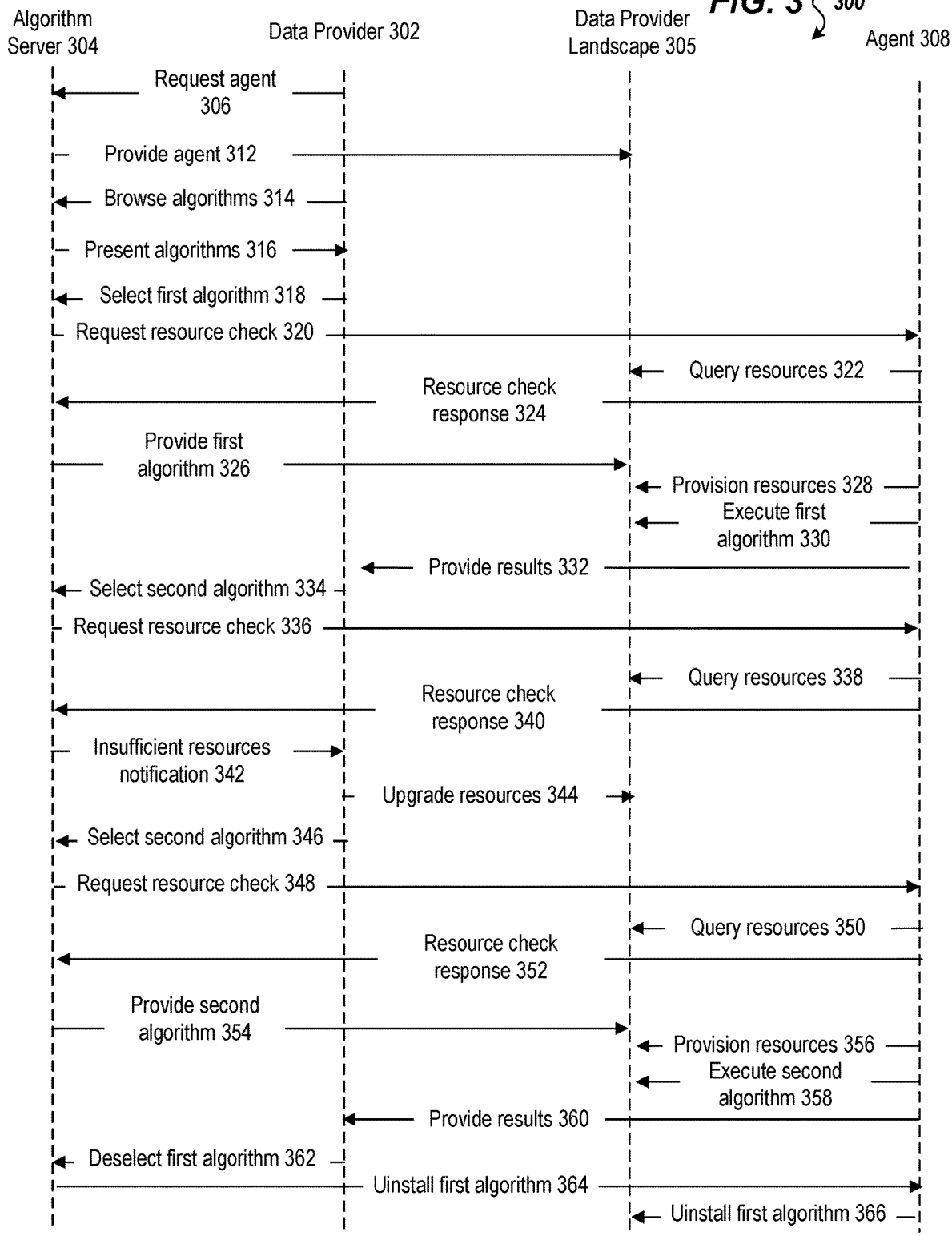
FIG. 3 is a flowchart of an example method for determining whether a data provider landscape has resources sufficient to run a third party algorithm.

FIG. 3 is a flowchart of an example method 300 for determining whether a data provider landscape has resources sufficient to run a third party algorithm. A data provider 302 sends a request to an algorithm server 304 for an agent to manage installations and/or instantiations of algorithms provided by the algorithm server 304 on a data provider landscape 305 of the data provider 302 (306). The algorithm server 304 provides an agent 308 to the data provider 302 for installation in the data provider landscape 305 (312). Installation of the agent is generally performed in advance of the selection of a particular algorithm. The data provider 302 sends a request to browse available algorithms (314) to the algorithm server 304. The algorithm server 304 provides a list of algorithms to be presented to the data provider 302 (316).

The data provider 302 selects a first algorithm and an indication of the selection is provided to the algorithm server 304 (318). In response to the selection by the data provider 305 of the first algorithm, the algorithm server 304 sends a resource check request (320) to the agent 308 for determining whether the data provider landscape 305 includes resources that are required by the first algorithm. In response to the resource check request 320, the agent 308 sends a query 322 to the data provider landscape 305 to obtain information about resources included in the data provider landscape 305. The agent 308 sends a resource check response 324 to the algorithm server 304. In some implementations, the agent 308 determines whether the resources included in the data provider landscape 305 are sufficient for running the first algorithm (e.g., by comparing needed-resources information included in the resource check request 320 to information obtained from the query 322), and sends an indication of whether the data provider landscape 305 is able to execute the first algorithm in the resource check response 324. In other implementations, the algorithm server 304 determines whether the data provider landscape 305 includes sufficient resources (e.g., the resource check response 324 can include a description of resources included in the data provider landscape 305 and the algorithm server 304 and perform the determination).

If the data provider landscape 305 includes the resources required to execute the first algorithm, the algorithm server 304 provides the first algorithm to the data provider landscape 305 (326). The agent 308 provisions resources of the data provider landscape 305 to prepare for execution of the first algorithm (328). The agent 308 initiates execution of the first algorithm in the data provider landscape 305 (330). The first algorithm can use data included in the data provider landscape 305. Execution of the first algorithm can result in the generation of a set of results, which the agent 308 provides to the data provider 302 (332), e.g., in a user interface.

The data provider 302 selects a second algorithm and an indication of the selection is provided to the algorithm server 304 (334). The data provider 302 may want to execute both the second algorithm and the first algorithm, for example, and compare results obtained using the first and second algorithms. In response to the selection by the data provider 302 of the second algorithm, the algorithm server 304 sends a resource check request (336) to the agent 308 for determining whether the data provider landscape 305 includes resources that are required by the second algorithm. In some implementations, the agent 308 sends a query 338 to the data provider landscape 305 to obtain information about resources included in the data provider landscape 305.

The query 338 can be specific to resources needed by the second algorithm, for example. In some implementations, the agent 308 does not send the query 338, but rather uses information obtained earlier using the query 322. The agent 308 sends a resource check response 340 to the algorithm server 304, which can include an indication regarding whether the data provider landscape 305 has sufficient resources to execute the second algorithm, or can include information that the algorithm server 304 uses to determine whether the data provider landscape 305 resources are sufficient for executing the second algorithm.

If the resources included in the data provider landscape 305 are not sufficient for executing the second algorithm, the algorithm server 304 can send an insufficient resources notification 342 to the data provider 302. The insufficient resources notification 342 can include information that indicates how the resources of the data provider landscape 305 are lacking for execution of the second algorithm. The data provider 302 can initiate efforts to upgrade the resources of the data provider landscape 305 so that the data provider landscape 305 is able to execute the second algorithm (344). After the upgrade, the data provider 302 can browse for and reselect the second algorithm (346).

The algorithm server 304 resends a resource check request (348) to the agent 308 for determining whether the upgraded data provider landscape 305 includes resources that are required by the second algorithm. The agent 308 sends a query 350 to the upgraded data provider landscape 305 to obtain information about resources included in the upgraded data provider landscape 305. The agent 308 sends a resource check response 352 to the algorithm server 304, which can include an indication regarding whether the upgraded data provider landscape 305 has sufficient resources to execute the second algorithm, or can include information that the algorithm server 304 uses to determine whether the upgraded data provider landscape 305 resources are sufficient for executing the second algorithm.

If the upgraded data provider landscape 305 includes the resources required to execute the second algorithm, the algorithm server 304 provides the second algorithm to the upgraded data provider landscape 305 (354). The agent 308 provisions resources of the upgraded data provider landscape 305 to prepare for execution of the second algorithm (356). The agent 308 initiates execution of the second algorithm in the upgraded data provider landscape 305 (358). The second algorithm can use data included in the upgraded data provider landscape 305 (e.g., the same, or at least some of the same data as used by the first algorithm). Execution of the second algorithm can result in the generation of a set of results, which the agent 308 provides to the data provider 302 (360), e.g., in a user interface.

The data provider 302 can compare the results from the first algorithm to the results from the second algorithm. The data provider 302 can decide, for example, that the second algorithm produces better results than the first algorithm. The data provider 302 can send a notification 362 to the algorithm sever 304 indicating that the data provider 302 desires to deselect (e.g., uninstall) the first algorithm. The algorithm server 304 sends a notification 364 to the agent 308 to uninstall the first algorithm. The agent 308 uninstalls the first algorithm (366) from the data provider landscape 305. The agent 308 can roll back the provisioning of the resources performed in step 328, for example. In some implementations, the agent 308 rolls back some or all of the provisioning of the resources for the first algorithm before provisioning resources for the second algorithm, and in such implementations, may perform some or no rollback of provisioning in response to the notification 364.

In some implementations, a data provider landscape is an IoT (Internet of Things) platform. In some implementations, an algorithm that runs in a data provider landscape, such as an IoT platform, obtains data from another system, such as another IoT platform or some other type of system, including but not limited to other systems external to a particular data consumer or data provider. As another example, in some implementations, the data provider landscape can make outputs generated by the running of the algorithm available to other systems, such as other IoT platforms, or to another entity, such as a data consumer.

Figure 4:
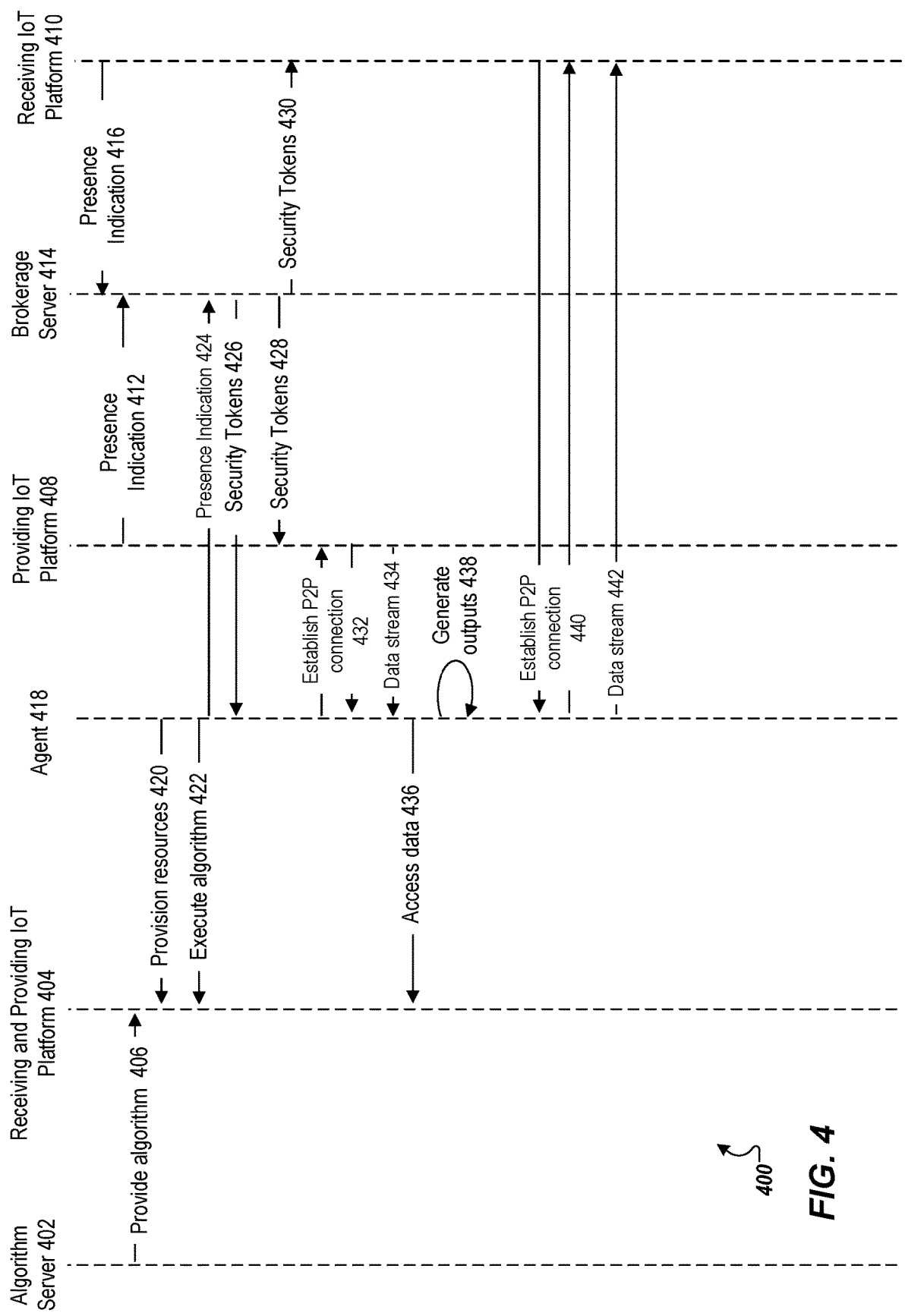
FIG. 4 is a flowchart of an example method for using data from a first data provider when executing an algorithm at a second data provider.

FIG. 4 is a flowchart of an example method 400 for using data from a first data provider when executing an algorithm at a second data provider. Data providers can be IoT platforms or some other type of data provider. An algorithm server 402 provides an algorithm to a receiving and providing IoT platform 404 (406). The receiving and providing IoT platform 404 can, for example, receive data from a providing IoT platform 408 as part of executing the algorithm and can provide data generated during execution of the algorithm to another system, such as a receiving IoT platform 410. In summary, in this example, the receiving and providing IoT platform 404 both receives and provides data, the providing IoT platform 408 provides data (e.g., to the receiving and providing IoT platform 404), and the receiving IoT platform 410 receives data (e.g., from the receiving and providing IoT platform 404).

The providing IoT platform 408 may have, for example, sent a presence indication 412 indicating the presence of the providing IoT platform 408 to a brokerage server 414. The brokerage server 414 can enable different IoT platforms to connect with one another and share data with one another after the pairing of the sending and receiving platforms has been brokered. The presence indication 412 can indicate a type, quantity, frequency, and price of data that is generated by the providing IoT platform 408 and available to be shared with other IoT platforms. The presence indication 412 can identify the providing IoT platform 408 and/or provide a network address of the providing IoT platform 408, such as an internet protocol (IP) address. As another example, the receiving IoT platform 410 may have sent a presence indication 416 to the brokerage server 414 describing a type, amount, frequency, and/or price of the data that the receiving IoT platform 410 is requesting to receive.

In response to receiving the algorithm provided by the algorithm server 402, an agent 418 installed in the receiving and providing IoT platform 404 provisions resources (420) in the receiving and providing IoT platform 404 to prepare for execution of the received algorithm. The agent 418 initiates execution of the received algorithm in the receiving and providing IoT platform 404 (422). As part of executing the received algorithm (or in some implementations, as part of the provisioning of resources), the agent 418 sends a presence indication 424 to the brokerage server 414.

The presence indication 424 can include a description of external data that the receiving and providing IoT platform 404 desires to use in order to execute the algorithm. The presence indication 424 can also include a description of data that is generated by the algorithm that the receiving and providing IoT platform 404 is making available to other platforms. In some implementations, the presence indication 424 includes a description of IoT data included in the receiving and providing IoT platform 404 (e.g., data that may be used by the algorithm as input data) that is being made available to other platforms. In other words, the receiving and providing IoT platform 404 can make available to other platforms input data used by the algorithm, output data generated by the algorithm, or other data included in the receiving and providing IoT platform 404 that is neither an input to nor an output from the algorithm.

The brokerage server 414 can identify the providing IoT platform 408 as providing the type of external data desired by the receiving and providing IoT platform 404. The brokerage server 414 can also identify the receiving IoT platform 410 as desiring the type of data to be made available by the receiving and providing IoT platform 404. The brokerage server 414 can generate and send security tokens for use in establishing connections for transferring data between IoT platforms. For example, the brokerage server 414 sends security tokens 426 to the receiving and providing IoT platform 404 for use in receiving data from the providing IoT platform 408 and providing data to the receiving IoT platform 410. As other examples, the brokerage server 414 sends security tokens 428 to the providing IoT platform 408 for use in sending data to the receiving and providing IoT platform 404 and sends security tokens 430 to the receiving IoT platform 410 for use in receiving data from the receiving and providing IoT platform 404.

As part of executing the algorithm, the agent 418 can, using security token(s) in the received security tokens 426, for example, establish a P2P (Peer to Peer) connection with the providing IoT platform 408 (432). After the P2P connection is established, the providing IoT platform 408 can send a data stream 434 to the agent 418. The agent 418 can, as part of executing the algorithm, access internal data 436 included in the receiving and providing IoT platform 404. The agent 418 can use the data received from the providing IoT platform 408 and the accessed internal data when executing the algorithm. As part of executing the algorithm, one or more outputs are generated (438).

As described above, the receiving and providing IoT platform 404 can make output data generated by the algorithm (and/or other data associated with the receiving and providing IoT platform 404) available to other platforms. A P2P connection can be established between the receiving IoT platform 410 and the receiving and providing IoT platform 404. Either the receiving IoT platform 410 or the receiving and providing IoT platform 404 can initiate the establishment of the P2P connection. After the P2P connection is established, a data stream 442 can be sent by the agent 418 to the receiving IoT platform 410.

As used herein, a P2P connection is a network connection between two entities through which the two entities may communicate. A P2P connection may be a direct connection between the entities, e.g., a connection that does not involve any intermediary systems, devices, or processes beyond those that are used to establish and maintain the connection. For example, a P2P connection may employ general purpose network infrastructure and appliances such as hubs, routers, switches, backbone systems, routing protocols, physical data communication lines, wireless transceivers for sending and receiving wireless data signals, and/or other network components, but the P2P connection may be otherwise unmediated by other systems, devices, and/or processes. In some implementations, the data brokerage system may perform operations to enable the platforms to connect with one another and share data, but the data brokerage system may be disintermediated after the initial setup of the P2P connection and may not participate in the P2P connection. In some instances, the data brokerage system may provide security tokens to the platforms to enable a secure P2P connection to be established between the platforms. The data brokerage system may then be disintermediated from the connection apart from, in some implementations, periodically sending updated security tokens to the platforms as described further below.

An IoT network or another type of data provider may include any number of IoT or other devices that generate data. The data provider devices may include but are not limited to any of the following: portable computing devices, such as smartphones, tablet computers, electronic book readers, mobile gaming platforms, wearable computing devices, implanted computing devices, etc.; immobile and/or less readily portable computing devices, such as personal computers, laptop computers, mainframe computers, rack-mounted servers, etc.; media devices, such as televisions, audio output (e.g., stereo) systems, gaming platforms, digital video recording and/or playback devices, etc.; environmental monitoring sensors and/or devices, such as air quality sensors, water quality sensors, soil quality sensors; sensors to measure air temperature, air pressure, wind speed and direction, water temperature, water pressure, water flow speed and direction, seismic vibration sensors, seismic (e.g., earthquake) warning systems, inclement weather (e.g., hurricane, tornado) warning systems, tsunami or flood warning systems, wildfire monitoring or warning systems, etc.; infrastructure management systems, such as sensors and/or devices to measure the condition and/or maintenance status of buildings, roads, bridges, tunnels, railroads, airports, etc.; manufacturing systems, such as sensors and/or devices to monitor and/or control automated manufacturing processes, supply chain networks, shipping networks, etc.; energy management systems, such as sensors and/or devices to monitor the generation, distribution, storage, and/or usage of electrical power, natural gas, other petroleum-based fuels, and so forth, for a particular building, set of buildings, municipality, and/or larger area; healthcare systems, such as sensors and/or devices for remote healthcare, health or biometric monitoring of individuals, emergency notification, and/or managing healthcare facilities such as hospitals, clinics, and so forth; building and/or home automation systems, including sensors and/or devices for monitoring and controlling electrical and/or mechanical devices in buildings, monitoring structural conditions of buildings, monitoring environment conditions in buildings (e.g., temperature, air quality, etc.), controlling lighting, air circulation, water, or other in-building systems, and so forth; building security systems, including sensors and/or devices for controlling building access, detecting unauthorized access, alarm systems, door lock systems, fire or smoke detectors, flood detectors, air quality sensors and/or warning systems, etc.; vehicle computers, such as telematics devices, on-board computing systems, vehicle sensors, smart vehicle components, etc.; transportation systems, including sensors and/or other devices for monitoring and/or controlling automobile traffic on roads, railway networks, air traffic, water traffic, and so forth, such as traffic sensors, stoplight cameras, vehicle speed sensors and/or cameras, toll collection systems, fleet management systems, fixed and/or mobile surveillance cameras, etc.; and/or automated and/or AI-enabled personal assistant devices for the home or other environments.

Figure 5:
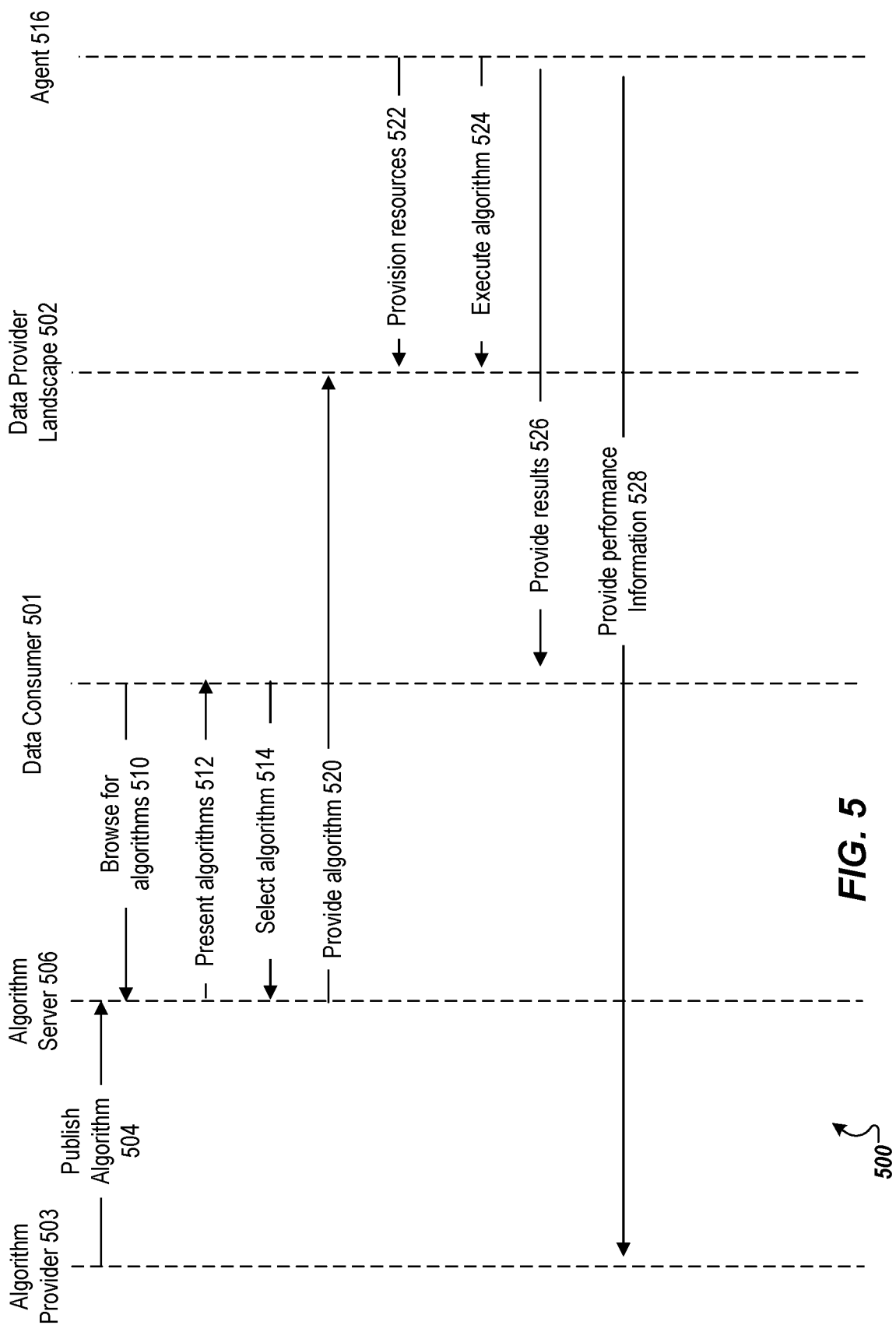
FIG. 5 is a flowchart of an example method for execution, of an algorithm selected by a data consumer, in a landscape of a data provider.

FIG. 5 is a flowchart of an example method 500 for execution, of an algorithm selected by a data consumer 501, in a landscape 502 of a data provider. The data consumer 501 and the data provider can be different entities, for example, and both can be separate entities from an algorithm provider 503. For example, the algorithm provider 503 publishes an algorithm (504) to an algorithm server 506 (or, alternatively, to the data consumer 501 or the data provider landscape 502). The algorithm can be used in the landscape 502 of the data provider and in other landscapes. The data consumer 501 sends a request to browse available algorithms (510) to the algorithm server 506. The algorithm server 506 provides a list of algorithms to be presented to the data consumer 501 (512). The data consumer 501 selects a presented algorithm and an indication of the selection is provided to the algorithm server 506 (514). The algorithm server 506 provides the algorithm to be installed in the data provider landscape 502 (520). An agent 516 may be already installed on the data provider landscape 502 before the algorithm is selected by the data consumer 501, for example.

The agent 516 provisions resources of the data provider landscape 502 to prepare for execution of the algorithm (522). The agent 516 initiates execution of the algorithm in the data provider landscape 502 (524). The algorithm can use data included in the data provider landscape 502. Execution of the algorithm can result in the generation of a set of results, which the agent 516 provides to the data consumer

501 (526). The agent 516 can also provide performance information regarding the execution of the algorithm to the algorithm provider 502 (528) and/or to the data provider.

Figure 6:
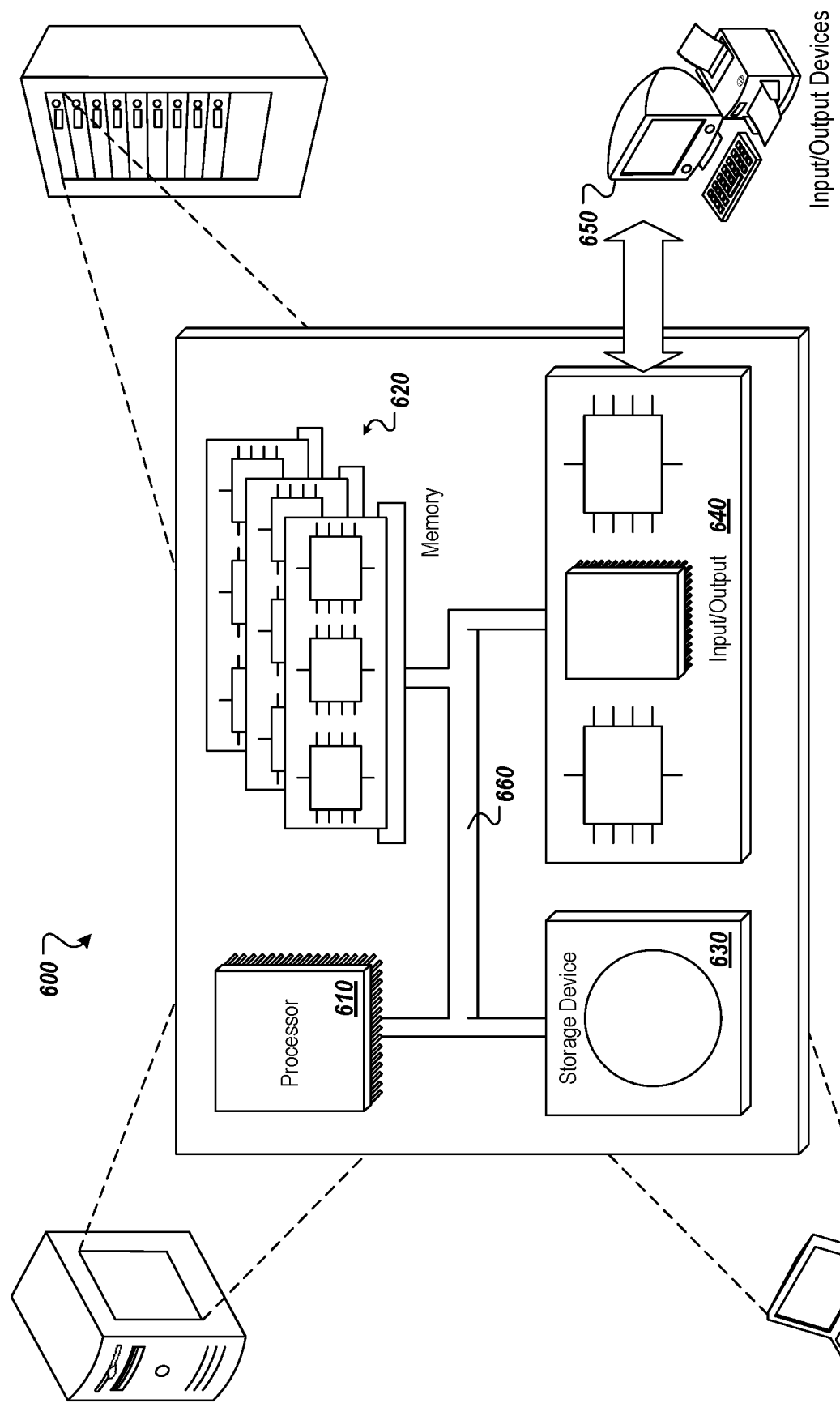
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the algorithm store 104, the data provider landscape 109, the IoT platforms and the brokerage server 414 described in FIG. 4, and/or other computing device(s) or systems of device(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, the method comprising:
receiving, from a data provider user and at a user interface of a search service provided by an algorithm marketplace, a request to browse algorithms to execute in an environment of the data provider using data provided by the data provider, wherein the algorithms are provided by algorithm providers that are separate entities than the data provider;
presenting, to the data provider user, in the user interface, in response to the request to browse algorithms, multiple algorithm descriptions of software algorithms, each software algorithm provided by an associated algorithm provider, wherein each algorithm description includes, for an associated algorithm, a description of resources required by the data provider to execute the associated algorithm in the environment of the data provider, and a description of data to be used by the associated algorithm;
receiving, at the user interface, selection of a first algorithm description, from among the multiple algorithm descriptions, from the data provider user; and
providing, in response to the selection of the first algorithm description, a first algorithm associated with the selected algorithm description to a software agent at the data provider, wherein the software agent is configured to:
provision first resources in the environment of the data provider, according to a first description of resources included in the first algorithm description, to enable execution of the first algorithm in the environment of the data provider;
execute the first algorithm in the environment of the data provider, using data included in the environment of the data provider and the first resources provisioned in the environment of the data provider, producing one or more outputs; and
provide the one or more outputs to the data provider.

2. The method of claim 1, wherein the first algorithm is configured to obtain data provided by another data provider that is different from the data provider.

3. The method of claim 1, wherein the data included in the environment of the data provider is private data maintained within the environment of the data provider.

4. The method of claim 3, further comprising enabling monitoring of the execution of the selected algorithm, including enabling the algorithm provider to view performance information related to the execution of the selected algorithm while preventing the algorithm provider from viewing the private data.

5. The method of claim 1, wherein the first resources include one or more of computing nodes, memory, network resources, and virtual machines.

6. The method of claim 1, wherein:
the software agent is further configured to identify resources currently installed in the environment of the data provider and provide information describing the installed resources; and
presenting the multiple algorithm descriptions comprises:
determining, based on the information describing the installed resources, whether the resources currently installed in the data provider landscape are sufficient for executing the first algorithm; and
presenting information that indicates whether the resources currently installed are sufficient to execute the first algorithm, including presenting information that indicates resource shortcomings when the resources currently installed are not sufficient.

7. The method of claim 1, wherein the one or more outputs comprise one or more insights determined based on the data included in the environment of the data provider.

8. The method of claim 1, wherein the data included in the environment of the data provider comprises data generated by a set of Internet of Things (IoT) devices.

9. A system, comprising:
at least one processor; and
a memory communicatively coupled to the at least one processor, the memory storing instructions which, when executed by the at least one processor, cause the at least one processor to perform operations comprising:
receiving, from a data provider user and at a user interface of a search service provided by an algorithm marketplace, a request to browse algorithms to execute in an environment of the data provider using data provided by the data provider, wherein the algorithms are provided by algorithm providers that are separate entities than the data provider;
presenting, to the data provider user, in the user interface, in response to the request to browse algorithms, multiple algorithm descriptions of software algorithms, each software algorithm provided by an associated algorithm provider, wherein each algorithm description includes, for an associated algorithm, a description of resources required by the data provider to execute the associated algorithm in the environment of the data provider, and a description of data to be used by the associated algorithm;
receiving, at the user interface, selection of a first algorithm description, from among the multiple algorithm descriptions, from the data provider user; and
providing, in response to the selection of the first algorithm description, a first algorithm associated with the selected algorithm description to a software agent at the data provider, wherein the software agent is configured to:
provision first resources in the environment of the data provider, according to a first description of resources included in the first algorithm description, to enable execution of the first algorithm in the environment of the data provider;
execute the first algorithm in the environment of the data provider, using data included in the environment of the data provider and the first resources provisioned in the environment of the data provider, producing one or more outputs; and
provide the one or more outputs to the data provider.

10. The system of claim 9, wherein the first algorithm is configured to obtain data provided by another data provider.

11. The system of claim 9, wherein the data included in the environment of the data provider is private data maintained within the environment of the data provider.

12. One or more computer-readable media storing instructions which, when executed by at least one processor, cause the at least one processor to perform operations comprising:
receiving, from a data provider user and at a user interface of a search service provided by an algorithm marketplace, a request to browse algorithms to execute in an environment of the data provider using data provided by the data provider, wherein the algorithms are provided by algorithm providers that are separate entities than the data provider;
presenting, to the data provider user, in the user interface, in response to the request to browse algorithms, multiple algorithm descriptions of software algorithms, each software algorithm provided by an associated algorithm provider, wherein each algorithm description includes, for an associated algorithm, a description of resources required by the data provider to execute the associated algorithm in the environment of the data provider, and a description of data to be used by the associated algorithm;
receiving, at the user interface, selection of a first algorithm description, from among the multiple algorithm descriptions, from the data provider user; and
providing, in response to the selection of the first algorithm description, a first algorithm associated with the selected algorithm description to a software agent at the data provider, wherein the software agent is configured to:
provision first resources in the environment of the data provider, according to a first description of resources included in the first algorithm description, to enable execution of the first algorithm in the environment of the data provider;
execute the first algorithm in the environment of the data provider, using data included in the environment of the data provider and the first resources provisioned in the environment of the data provider, producing one or more outputs; and
provide the one or more outputs to the data provider.

13. The computer-readable media of claim 12, wherein the data included in the environment of the data provider is private data maintained within the environment of the data provider.

* * * * *